US010111047B2

(12) United States Patent
Chen

(10) Patent No.: US 10,111,047 B2
(45) Date of Patent: Oct. 23, 2018

(54) POSITIONING METHOD AND DEVICE

(71) Applicant: Huawei Technologies Co., Ltd., Shenzhen, Guangdong (CN)

(72) Inventor: Shanxi Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 89 days.

(21) Appl. No.: 15/081,598

(22) Filed: Mar. 25, 2016

(65) Prior Publication Data

US 2016/0212592 A1 Jul. 21, 2016

Related U.S. Application Data

(63) Continuation of application No. PCT/CN2014/078236, filed on May 23, 2014.

(30) Foreign Application Priority Data

Sep. 27, 2013 (CN) .......................... 2013 1 0451658

(51) Int. Cl.
*H04W 24/00* (2009.01)
*H04W 4/04* (2009.01)
*H04W 4/02* (2018.01)

(52) U.S. Cl.
CPC .......... *H04W 4/043* (2013.01); *H04W 4/023* (2013.01)

(58) Field of Classification Search
CPC .............................. H04W 4/043; H04W 4/023
USPC .............................. 455/456.1–456.6; 370/338
See application file for complete search history.

(56) References Cited

U.S. PATENT DOCUMENTS

| 7,558,671 | B2 | 7/2009 | Dossas et al. |
| 7,835,342 | B2 | 11/2010 | Lee |
| 8,073,795 | B2 | 12/2011 | Honisch |
| 2007/0072623 | A1 | 3/2007 | Shyr et al. |

(Continued)

FOREIGN PATENT DOCUMENTS

| CN | 102075936 A | 5/2011 |
| CN | 103259777 A | 8/2013 |

(Continued)

OTHER PUBLICATIONS

Chao Ma, "Indoor pinpointing: Google has released Android apps to heip imprpve Google Maps indoor targeting", Apr. 6, 2012, 8 pages.

*Primary Examiner* — Marcos Batista

(57) ABSTRACT

The present invention discloses a positioning method, including: acquiring, by a mobile terminal, a location of the mobile terminal in open space; determining, by the mobile terminal according to the location of the mobile terminal in the open space, first closed space that corresponds to the location of the mobile terminal in the open space and in which a closed positioning service is provided; and performing, by the mobile terminal after determining the first closed space, closed positioning for the mobile terminal by using a closed positioning program and map data. The method of the present invention enables a mobile terminal to automatically perform closed positioning without the need to artificially identify closed space in which the mobile terminal is located and search for a corresponding closed positioning program, and therefore provides convenience for a user and can improve accuracy of closed positioning.

24 Claims, 10 Drawing Sheets

(56) References Cited

U.S. PATENT DOCUMENTS

| | | |
|---|---|---|
| 2011/0106449 A1 | 5/2011 | Chowdhary et al. |
| 2012/0088487 A1 | 4/2012 | Khan |
| 2013/0219437 A1 | 8/2013 | Ban et al. |
| 2014/0185603 A1* | 7/2014 | Kaippallimalil ...... H04W 12/08 370/338 |
| 2015/0038171 A1* | 2/2015 | Uilecan ................ G06Q 10/109 455/456.3 |

FOREIGN PATENT DOCUMENTS

| | | |
|---|---|---|
| CN | 103533637 A | 1/2014 |
| EP | 2629261 A1 | 8/2013 |
| WO | 03/098896 A1 | 11/2003 |

* cited by examiner

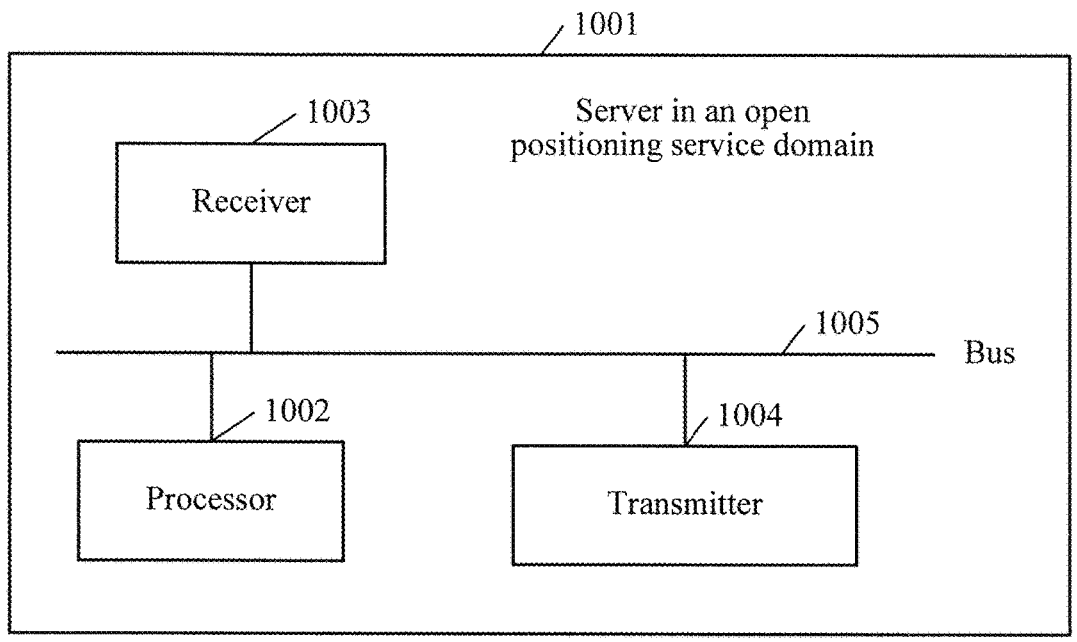

FIG. 14

```
┌─────────────────────────────────────────────────────────────┐
│ A server in an open positioning service domain receives     │ ─── 1101
│ request information sent by a terminal, where the request   │
│ information is used to request the server in the open       │
│ positioning service domain to send map data of first closed │
│ space to the terminal, and the first closed space is closed │
│ space corresponding to a location of the terminal in the    │
│                       open space                            │
└─────────────────────────────────────────────────────────────┘
                              │
                              ▼
┌─────────────────────────────────────────────────────────────┐ ─── 1102
│ Send the map data of the first closed space to the terminal │
│              according to the request information           │
└─────────────────────────────────────────────────────────────┘
```

FIG. 15

POSITIONING METHOD AND DEVICE

CROSS-REFERENCE TO RELATED APPLICATIONS

This application is a continuation of International Application No. PCT/CN2014/078236, filed on May 23, 2014, which claims priority to Chinese Patent Application No. 201310451658.X, filed on Sep. 27, 2013, both of which are hereby incorporated by reference in their entireties.

TECHNICAL FIELD

The present invention relates to the field of communications technologies, and in particular, to a positioning method and device.

BACKGROUND

With the development of location based service (Location Based Service, LBS) technologies, intelligent terminals become carriers that implement and run LBSs. By using an intelligent terminal, a user can use an LBS in real time, and acquire a geographical location of the user, that is, implement a positioning function. Environments of geographical locations of users can be classified into open geographical location environments (which are also referred to as open space) and closed geographical location environments (which are also referred to as closed space). Therefore, positioning functions provided by LBS services are classified into open positioning and closed positioning (which is also referred to as indoor positioning).

The so-called open positioning is a positioning manner for a geographical location that is directly visible in all domains, which, for example, can be directly positioned within coverage of a Global Positioning System (Global Positioning System, GPS). The so-called closed positioning is a positioning manner for closed space that cannot be covered by the GPS, for example, a geographical location which is inside a room or whose details are not visible in all domains. It can be known based on the existing implementation and technical methods that implementation manners of open positioning and closed positioning are different.

In the aspect of open positioning, service providers provide open positioning services by using map data and map programs (or applications). These map programs perform positioning by directly using a satellite such as a GPS satellite, or perform cellular positioning by indirectly using a satellite, and can provide users with a uniform location display interface by using a uniform positioning capability. At present, technologies of positioning services provided based on these methods become increasingly mature.

In the aspect of closed positioning, it is a different case. Closed positioning has closeness of positioning, and the closeness of positioning mainly refers to non-openness and complexity of the inside of a building. Location information of a piece of closed space not only includes differences between building floors, but also includes diverse environments and variable details, and may even include a difference in and dependence on hardware with a positioning capability. Moreover, because a map of closed space has finer textures and shows richer details, it may result in a larger amount of map data. All of these lead to complexity of performing closed positioning for closed space. Therefore, it is difficult to provide a uniform closed space positioning service, and it is also difficult to integrate closed space positioning with open space positioning.

At present, an open positioning technology is basically mature, but a closed space positioning technology is still in constant development. A conventional closed space positioning method requires that a user artificially identifies closed space in which the user is located and the user manually selects, according to the identified closed space, a closed positioning program corresponding to the closed space to perform closed positioning. If the closed positioning program corresponding to the closed space is not installed in a mobile terminal of the user, the user needs to artificially search for, download, and install the closed positioning program corresponding to the closed space. The conventional closed space positioning method requires that a user artificially identifies closed space in which the user is located and artificially selects and runs a corresponding closed positioning program, which leads to relatively complex positioning and poor user experience. Moreover, because the method relies on subjective judgment and selection by a person, it is difficult to ensure positioning accuracy.

SUMMARY

The present invention provides a positioning method, which enables a mobile terminal to automatically perform closed positioning and can improve accuracy of closed positioning and therefore improve user experience.

A first aspect of the present invention provides a positioning method, including:

determining, by a terminal, a location of the terminal in open space by using an open positioning program;

acquiring, by the terminal according to the location of the terminal in the open space, an address of a second server from mapping information stored in a first server, where the first server is a server in an open positioning service domain, the second server is a server in a closed positioning service domain, and the mapping information includes a mapping relationship between the location of the terminal in the open space and the address of the second server;

acquiring, by the terminal, map data of first closed space from the second server according to the address of the second server and the location of the terminal in the open space, where the first closed space is closed space corresponding to the location of the terminal in the open space; and acquiring, by the terminal, location information of the terminal in the first closed space by using a closed positioning program used to perform positioning in closed space and the map data of the first closed space.

With reference to the first aspect of the present invention, in a first possible implementation manner of the first aspect, before the acquiring, by the terminal, location information of the terminal in the first closed space by using a closed positioning program used to perform positioning in closed space and the map data of the first closed space, the method further includes: monitoring, by the terminal, whether the terminal enters the first closed space; and the acquiring, by the terminal, location information of the terminal in the first closed space by using the closed positioning program and the map data of the first closed space includes:

when it is detected that the terminal enters the first closed space, performing, by the terminal running the closed positioning program, closed positioning for the terminal by using the map data of the first closed space, to obtain the location information of the terminal in the first closed space.

With reference to the first aspect of the present invention or the first possible implementation manner of the first aspect, in a second possible implementation manner, before the acquiring, by the terminal, location information closed positioning program of the terminal in the first closed space by using a closed positioning program used to perform positioning in closed space and the map data of the first closed space, the method further includes:

acquiring, by the terminal, the closed positioning program from the second server; and loading, by the terminal, the closed positioning program as a plug-in into the open positioning program; and the acquiring, by the terminal, location information of the terminal in the first closed space by using a closed positioning program used to perform positioning in closed space and the map data of the first closed space includes:

running, by the terminal, the closed positioning program by using the open positioning program, so that the closed positioning program performs the closed positioning for the terminal by using the map data of the first closed space, to obtain the location information of the terminal in the first closed space.

With reference to the second possible implementation manner of the first aspect of the present invention, in a third possible implementation manner of the first aspect, after the acquiring, by the terminal, location information of the terminal in the first closed space by using the closed positioning program and the map data of the first closed space, the method further includes:

displaying, by the terminal, the acquired location information of the terminal in the first closed space by using the open positioning program.

A second aspect of the present invention provides a terminal, including:

a first positioning unit, configured to determine a location of the terminal in open space by using an open positioning program;

a first acquiring unit, configured to acquire, according to the location that is of the terminal in the open space and that is determined by the first positioning unit, an address of a second server in a closed positioning service domain from mapping information stored in a first server in an open positioning service domain, where the mapping information includes a mapping relationship between the location of the terminal in the open space and the address of the second server;

a second acquiring unit, configured to acquire map data of first closed space from the second server according to the address, which is acquired by the first acquiring unit, of the second server and the location of the terminal in the open space, where the first closed space is closed space corresponding to the location of the terminal in the open space; and a second positioning unit, configured to acquire location information of the terminal in the first closed space by using a closed positioning program and the map data, which is acquired by the second acquiring unit, of the first closed space.

With reference to the second aspect of the present invention, in a first possible implementation manner of the second aspect, the terminal further includes a monitoring unit, where the monitoring unit is configured to: before the second positioning unit acquires the location information of the terminal in the first closed space by using the closed positioning program and the map data of the first closed space, monitor whether the terminal enters the first closed space; and the second positioning unit is specifically configured to: when the monitoring unit detects that the terminal enters the first closed space, run the closed positioning program, so that the closed positioning program performs closed positioning for the terminal by using the map data of the first closed space, to obtain the location information of the terminal in the first closed space.

With reference to the second aspect of the present invention or the first possible implementation manner of the second aspect, in a second possible implementation manner of the second aspect, the second acquiring unit is further configured to:

acquire the closed positioning program from the second server, and load the closed positioning program as a plug-in into the open positioning program; and the second positioning unit is specifically configured to:

run the closed positioning program by using the open positioning program, so that the closed positioning program performs the closed positioning for the terminal by using the map data of the first closed space, to obtain the location information of the terminal in the first closed space.

With reference to the second possible implementation manner of the second aspect of the present invention, in a third possible implementation manner of the second aspect, the terminal further includes:

a display unit, configured to display the location information, which is acquired by the second positioning unit, of the terminal in the first closed space by using the open positioning program.

A third aspect of the present invention provides another terminal, including: a processor and a transmitter and a receiver that are separately connected to the processor, where the processor is configured to:

determine a location of the terminal in open space by using an open positioning program;

after the location of the terminal in the open space is determined, send first request information to a first server by using the transmitter, where the first request information includes location information of the terminal in the open space, so that the first server sends an address of a second server in mapping information in the first server to the terminal according to the first request information, where the first server is a server in an open positioning service domain, the second server is a server in a closed positioning service domain, and the mapping information includes a mapping relationship between the location of the terminal in the open space and the address of the second server;

receive, by using the receiver, the address of the second server sent by the first server, and send, by using the transmitter, second request information to the second server according to the address of the second server received by the receiver, so that the second server sends map data of first closed space to the terminal according to the second request information, where the first closed space is closed space corresponding to the location of the terminal in the open space; and receive, by using the receiver, the map data of the first closed space sent by the second server, and acquire location information of the terminal in the first closed space by using the closed positioning program and the map data of the first closed space.

With reference to the third aspect of the present invention, in a first possible implementation manner, the terminal further includes: a sensor connected to the processor, where the sensor is configured to: before the processor acquires the location information of the terminal in the first closed space by using the closed positioning program and the map data of the first closed space, monitor whether the terminal enters the first closed space; and in the aspect of acquiring the location information of the terminal in the first closed space by using the closed positioning program and the map data of the first closed space, the processor is specifically configured to: when the terminal detects that the terminal enters the first closed space, run the closed positioning program, so that the closed positioning program acquires the location information of the terminal in the first closed space by using the map data of the first closed space.

A fourth aspect of the present invention provides a server address providing method, including:

receiving, by a first server, request information of a terminal, where the request information includes location information of the terminal in open space, and the first server is a server in an open positioning service domain; and sending an address of a second server in mapping information in the first server to the terminal according to the request information, where the second server is a server in a closed positioning service domain, and the mapping information includes a mapping relationship between a location of the terminal in the open space and the address of the second server, so that the terminal acquires map data of first closed space from the second server according to the address of the second server, where the first closed space is closed space corresponding to the location of the terminal in the open space, and therefore the terminal acquires location information of the terminal in the first closed space by using a closed positioning program and the map data of the first closed space.

A fifth aspect of the present invention provides a server in an open positioning service domain, including:

a receiving unit, configured to receive request information of a terminal, where the request information includes location information of the terminal in open space; and a sending unit, configured to send an address of a second server in mapping information in the server in the open positioning service domain to the terminal according to the request information received by the receiving unit, where the second server is a server in a closed positioning service domain, and the mapping information includes a mapping relationship between a location of the terminal in the open space and the address of the second server, so that the terminal acquires map data of first closed space from the second server according to the address of the second server, where the first closed space is closed space corresponding to the location of the terminal in the open space, and therefore the terminal acquires location information of the terminal in the first closed space by using a closed positioning program and the map data of the first closed space.

A sixth aspect of the present invention provides a server in an open positioning service domain, including: a processor and a transmitter and a receiver that are separately connected to the processor, where the processor is configured to:

receive request information of a terminal by using the receiver, where the request information includes location information of the terminal in open space; and send, by using the transmitter, an address of a second server in mapping information in the server in the open positioning service domain to the terminal according to the request information received by the receiver, where the second server is a server in a closed positioning service domain, and the mapping information includes a mapping relationship between a location of the terminal in the open space and the address of the second server, so that the terminal acquires map data of first closed space from the second server according to the address of the second server, where the first closed space is closed space corresponding to the location of the terminal in the open space, and therefore the terminal acquires location information of the terminal in the first closed space by using a closed positioning program and the map data of the first closed space.

A seventh aspect of the present invention provides a method for providing a closed positioning service, including:

receiving, by a server in an open positioning service domain, request information sent by a terminal, where the request information is used to request the server in the open positioning service domain to send map data of first closed space to the terminal, and the first closed space is closed space corresponding to a location of the terminal in the open space; and sending the map data of the first closed space to the terminal according to the request information.

With reference to the seventh aspect of the present invention, in a first possible implementation manner, the terminal further includes:

after the receiving, by a server in an open positioning service domain, request information sent by the terminal, the method further includes:

initiating, by the server in the open positioning service domain, a user identity authentication request to the terminal, so that the terminal sends user identity information in the terminal to a server in the closed positioning service domain;

receiving the user identity information sent by the terminal, and performing authentication on the user identity information; and if the user identity information is successfully authenticated in the server in the closed positioning service domain, sending the map data of the first closed space to the terminal.

An eighth aspect of the present invention provides a server in a closed positioning service domain, including: a receiving unit, configured to receive request information sent by a terminal, where the request information is used to request a server in the open positioning service domain to send map data of first closed space to the terminal, and the first closed space is closed space corresponding to a location of the terminal in the open space; and a sending unit, configured to send the map data of the first closed space to the terminal according to the request information received by the receiving unit.

A ninth aspect of the present invention provides a server in a closed positioning service domain, including: a processor and a transmitter and a receiver that are separately connected to the processor, where the processor is configured to:

receive, by using the receiver, request information sent by a terminal, where the request information is used to request a server in the open positioning service domain to send map data of first closed space to the terminal, and the first closed space is closed space corresponding to a location of the terminal in the open space; and send, by using the transmitter, the map data of the first closed space to the terminal according to the request information received by the receiver.

In the positioning method provided by the embodiments of the present invention, a terminal acquires, according to a location of the terminal in open space, an address of a server in a closed positioning service domain from mapping information stored in a server in an open positioning service domain, acquires map data of closed space corresponding to the location of the terminal in the open space from the server in the closed positioning service domain, and performs closed positioning for the terminal by using the map data, thereby implementing a function of automatic closed positioning of the terminal. Because in an entire positioning process, there is no need to artificially identify the closed space in which the terminal is located and search for a corresponding closed positioning program, convenience is provided for a user, and accuracy of closed positioning can be improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 14 is a schematic structural diagram of a server in an open positioning service domain according to an embodiment of the present invention;

FIG. 15 is a schematic flowchart of a method for providing a closed positioning service according to an embodiment of the present invention;

DETAILED DESCRIPTION

The following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

The present invention provides a positioning method and device. To make the technical solutions in the present invention more comprehensible, the following describes in detail the embodiments of the present invention with reference to the accompanying drawings.

Embodiment 1

Figure 1:
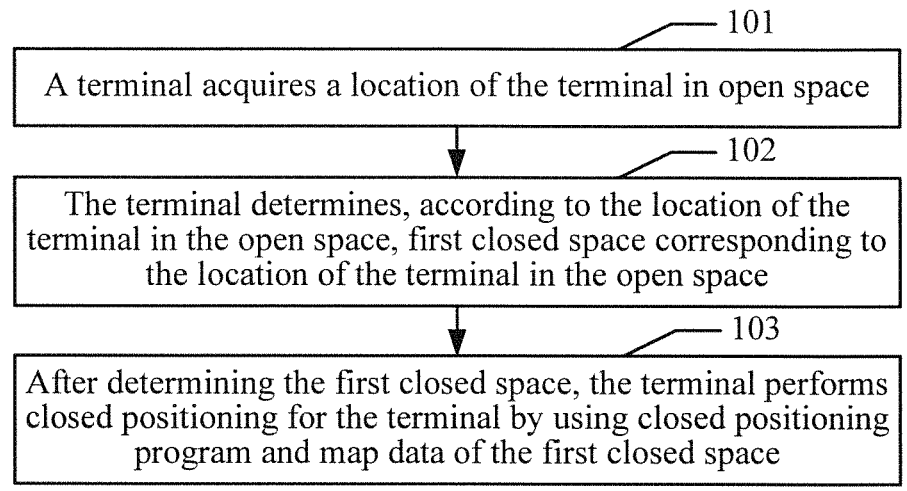
FIG. 1 is a flowchart of a positioning method according to an embodiment of the present invention.

As shown in FIG. 1, Embodiment 1 of the present invention provides a positioning method, including:

101: A terminal acquires a location of the terminal in open space.

The terminal may be a terminal having an open positioning function, such as a smartphone or a tablet computer. The terminal can acquire the location of the terminal in the open space by using an open positioning program, for example, a GPS.

102: The terminal determines, according to the location of the terminal in the open space, first closed space corresponding to the location of the terminal in the open space.

It should be noted that in this embodiment of the present invention, open space refers to an outdoor area that can be covered by a GPS or other conventional satellite navigation systems, such as a road, a square, or a sea surface; open space generally does not include an area inside a building, such as inner space of a mall, a hospital, or an office building; and closed space refers to an indoor area that cannot be covered by a conventional satellite navigation system, such as the inside of a mansion or a residential building.

When a location of a piece of open space is within an area, occupied by closed space, in the open space, the location in the open space corresponds to the closed space in which a closed positioning service is provided. For example, when a location of a terminal in open space is within coverage of a piece of closed space (for example, a mall or a restaurant), the location of the terminal in the open space corresponds to the closed space. Therefore, the terminal can determine, according to the location of the terminal in the open space and a correspondence between the location in the open space and the closed space, the first closed space corresponding to the location of the terminal in the open space. Specifically, the terminal may locally store or acquire, from a server in an open positioning service domain, information about a mapping between open locations and closed space, where content of the mapping information may include information about the correspondence between the location in the open space and the closed space in which the closed positioning service is provided. The terminal can determine, according to the location of the terminal in the open space and the mapping information, the first closed space that corresponds to the location of the terminal in the open space and in which the closed positioning service is provided.

In addition, a location in open space may correspond to closed space, in which a closed positioning service is provided, in another indirect manner. For example, a location of a piece of open space corresponds to a server of a closed positioning service domain, and the server of the closed positioning service domain corresponds to a piece of closed space in which a closed positioning service is provided, where the server of the closed positioning service domain is configured to provide the closed positioning service in the closed space corresponding to the server in the closed positioning service domain. It can be seen that a correspondence between the location in the open space and the server of the closed positioning service domain indicates a correspondence between the location in the open space and the closed space.

Further, after determining the first closed space, the terminal acquires, according to the location of the terminal in the open space, an address that corresponds to the location of the terminal in the open space and that is of a server B of a closed positioning service domain from mapping information stored in a first server in an open positioning service domain, and acquires map data of the first an open positioning service domain, and acquires map data of the first closed space from the server B according to the address and the location of the terminal in the open space.

103: After determining the first closed space, the terminal performs closed positioning for the terminal by using a closed positioning program and map data of the first closed space.

In step 103, if the closed positioning program and the map data of the first closed space are already installed in the terminal, the terminal may directly run the closed positioning program, load the map data of the first closed space, and perform the closed positioning for the terminal, to acquire location information of the terminal in the first closed space. If neither the closed positioning program nor the map data of the first closed space is installed in the terminal, the terminal first acquires the closed positioning program and the map data of the first closed space from the server B of the closed positioning service domain and installs the closed positioning program and the map data of the first closed space, and runs the closed positioning program to perform the closed positioning for the terminal.

It should be noted that a closed positioning program is an application program used to perform closed positioning for closed space, and may be a customized positioning program. For example, a closed positioning program dedicatedly corresponding to first closed space implements a positioning function for the first closed space; application scenarios and is used to perform closed positioning for multiple pieces of closed space, for example, a same closed positioning program implements positioning for different pieces of closed space by loading map data of the different pieces of closed space. The closed positioning program may be acquired from a server of a closed positioning service domain, for example, acquired from the server B, or may be acquired from another universal server, which is not specially limited in this embodiment of the present invention.

In the positioning method provided in Embodiment 1 of the present invention, a terminal determines, according to a location of the terminal in open space, first closed space that corresponds to the location of the terminal in the open space and in which a closed positioning service is provided, and performs closed positioning for the terminal by using a closed positioning program and map data of the first closed space, thereby implementing a function of automatic closed positioning of the terminal. Because in an entire positioning process, there is no need to artificially identify the closed space in which the terminal is located and search for the corresponding closed positioning program, convenience is provided for a user, and accuracy of closed positioning can be improved.

Embodiment 2

Figure 2:
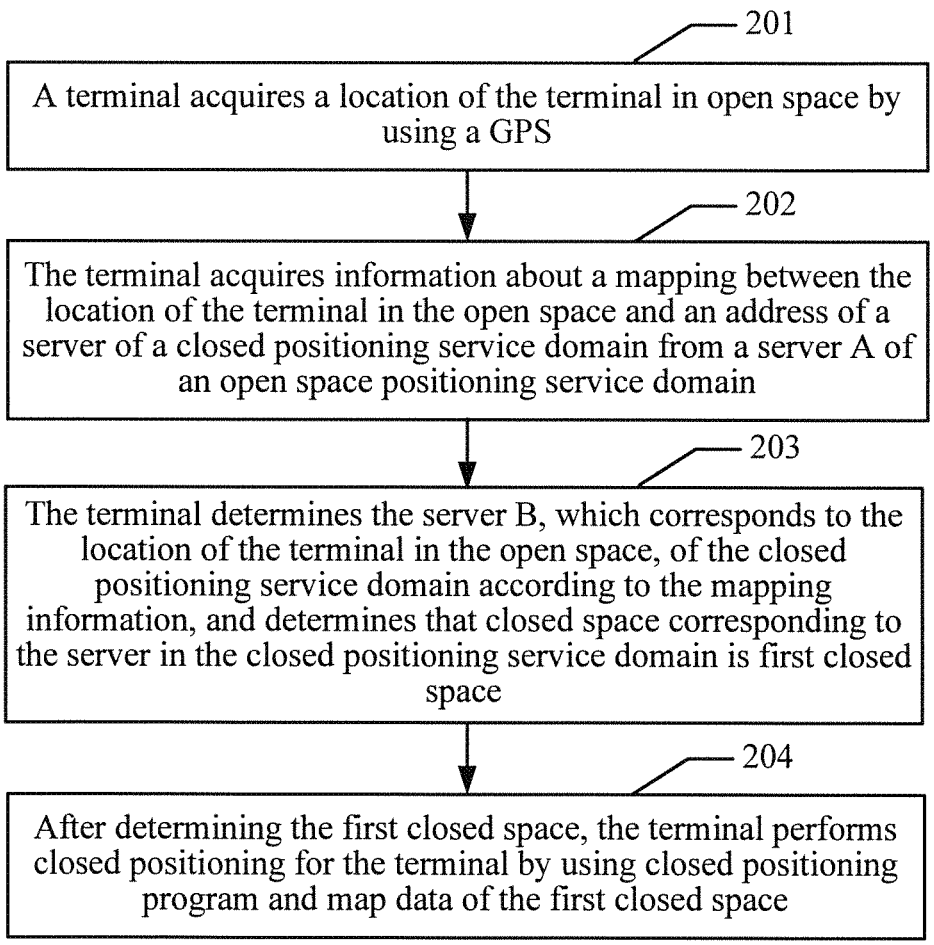
FIG. 2 is a flowchart of a positioning method according to an embodiment of the present invention.

As shown in FIG. 2, Embodiment 2 of the present invention provides a positioning method, including:

201: A terminal acquires a location of the terminal in open space by using a GPS.

In a process of performing open positioning, positioning accuracy of a location exists. Therefore, when acquiring the location of the terminal in the open space, the terminal also obtains positioning accuracy of the location.

202: The terminal acquires information about a mapping between the location of the terminal in the open space and an address of a server of a closed positioning service domain from a server A of an open space positioning service domain.

In step 202, the server in the open positioning service domain is configured to provide an open positioning service for the terminal. The server in the open positioning service domain may be provided with a mapping relationship table of locations in open space versus addresses of servers of closed positioning service domains, where the locations in open space in the mapping relationship table include the location of the terminal in the open space. Therefore, the mapping information can be found in the mapping relationship table in the server in the open positioning service domain according to the location of the terminal in the open space. In addition, the mapping information may also be found more accurately and quickly in the mapping relationship table in the server in the open positioning service domain according to the location of the terminal in the open space and the positioning accuracy.

203: The terminal determines the server B, which corresponds to the location of the terminal in the open space, of the closed positioning service domain according to the mapping information, and determines that closed space corresponding to the server in the closed positioning service domain is the first closed space.

The address, which corresponds to the location of the terminal in the open space, of the server of the closed positioning service domain can be determined according to the mapping information; that is, the server B, which corresponds to the location of the terminal in the open space, of the closed positioning service domain is determined.

204: After determining the first closed space, the terminal performs closed positioning for the terminal by using a closed positioning program and map data of the first closed space.

Step 204 may include: after the first closed space is determined, when the closed positioning program used to perform positioning in closed space is not installed in the terminal, acquiring the closed positioning program from the server in the closed positioning service domain; and when the map data of the first closed space is not installed in the terminal, acquiring the map data of the first closed space from the server in the closed positioning service domain. After acquiring the map data of the first closed space, the terminal performs closed positioning for the terminal by using the closed positioning program and the map data. It should be noted herein that the server in the closed positioning service domain is configured to provide a closed positioning service in the first closed space, where the closed positioning service includes providing the map data of the first closed space, and further, the closed positioning service may further provide the closed positioning program corresponding to the first closed space.

Preferably, the server in the closed positioning service domain is configured to manage a closed positioning program and map data, and provide a latest version of a closed positioning program and latest map data, to ensure that the terminal acquires the latest version of the closed positioning program and the latest map data from the server.

Step 204 may further include:

after the first closed space is determined, when a closed positioning program that is already installed in the terminal needs to be updated, acquiring a latest closed positioning program from the server in the closed positioning service domain and performing updating;

when map data, which is already installed in the terminal, of the first closed space needs to be updated, acquiring latest map data of the first closed space from the server in the closed positioning service domain and performing updating; and after the terminal updates the closed positioning program and the map data of the first closed space, using the updated closed positioning program and map data.

In this embodiment, the server in the open positioning service domain is a server of an open positioning service domain, and is configured to provide an open positioning service. Specifically, the server in the open positioning service domain is configured to provide a terminal with map data of open space and a space application program, manage information about a mapping between locations in open space and service addresses of space services of closed space, and provide a terminal with the mapping information; the server in the closed positioning service domain is a server of a closed positioning service domain, and is configured to provide a closed positioning service. Therefore, the closed positioning service and the open positioning service are managed by servers in different management domains, and are not managed by a same server in a management domain, thereby overcoming a problem of insufficient resources of a server of a single management domain. Further, the server in the closed positioning service domain provides a closed positioning service only in closed space corresponding to the server. Different pieces of closed space may separately correspond to servers of different closed positioning service domains. For example, a first building belongs to party A, and party A provides a server of a first closed positioning service domain, to provide a closed positioning service in closed space of the first building; a second building belongs to party B, and party B also provides a server of a second closed positioning service domain, to provide a closed positioning service in closed space of the second building. Therefore, the closed space of the first building and the closed space of the second building separately correspond to servers of different closed positioning service domains. The server of the first closed positioning service domain and the server of the second closed positioning service domain separately provide closed positioning services of respective closed space. Therefore, a server of a single closed positioning service domain has adequate resources to accommodate map data of closed space corresponding to the server. In addition, because closed positioning services of closed space of different buildings can be provided by servers of respective closed positioning service domains, that is, can be provided by servers provided by respective owners of the buildings, there is no need to set a uniform requirement on positioning hardware of locations of all closed domains, and servers of different closed positioning service domains may provide a closed positioning service according to a feature of respective closed space; moreover, such flat map data storage, management, and access help improve a map access capability of a closed positioning service and improve user experience. In addition, in this embodiment of the present invention, because owners of buildings can provide, by using respective servers of closed positioning service domains, a closed positioning service for a user that enters the buildings, there is no need to use a positioning server provided by a large positioning service provider. Therefore, a probability of leakage of a feature and monitoring data of closed space can be reduced.

Figure 3:
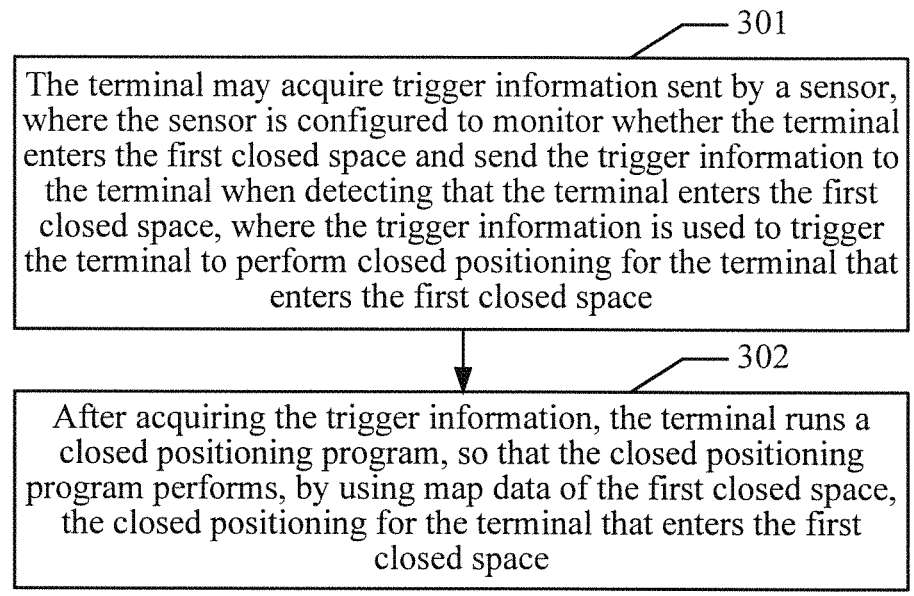
FIG. 3 is a flowchart of steps of triggering a terminal to perform closed positioning according to an embodiment of the present invention.

As shown in FIG. 3, in Embodiment 2 of the present invention, after the terminal determines the first closed space that corresponds to the location of the terminal in the open space and in which the closed positioning service is provided, closed positioning performed by the terminal may be triggered by taking the following technical measures, which specifically include:

301: The terminal may acquire trigger information sent by a sensor, where the sensor is configured to monitor whether the terminal enters the first closed space and send the trigger information to the terminal when detecting that the terminal enters the first closed space, where the trigger information is used to trigger the terminal to perform closed positioning for the terminal that enters the first closed space.

302: After acquiring the trigger information, the terminal runs a closed positioning program, so that the closed positioning program performs, by using map data of the first closed space, the closed positioning for the terminal that enters the first closed space, where the sensor may be disposed in the terminal, and may be an infrared detection, ultrasonic detection, or image capturing sensor, or may be another sensor that can detect closed space, which is not limited herein.

Further, the sensor is further configured to send the trigger information to the terminal when detecting that the terminal enters the first closed space from open space.

Alternatively, the sensor is further configured to send the trigger information to the terminal when detecting that the terminal enters the first closed space from second closed space.

In Embodiment 2 of the present invention, the terminal may acquire the location of the terminal in the open space by using an open positioning program. After determining the first closed space, the terminal may perform, by using the closed positioning program and the map data of the first closed space, the closed positioning for the terminal in three manners. The specific implementation manners include:

a first manner: loading, by the terminal, the closed positioning program as a plug-in into the open positioning software, and running the closed positioning program, to perform the closed positioning for the terminal;

a second manner: starting, by the terminal by using the open positioning software, the closed positioning program in a service-based manner, and displaying, by using the open software, a result of the closed positioning performed by the closed positioning program for the terminal; and a third manner: when the terminal runs the closed positioning program, putting, by the terminal, the open software in a background run queue of a system in which the open software is located.

Figure 4:
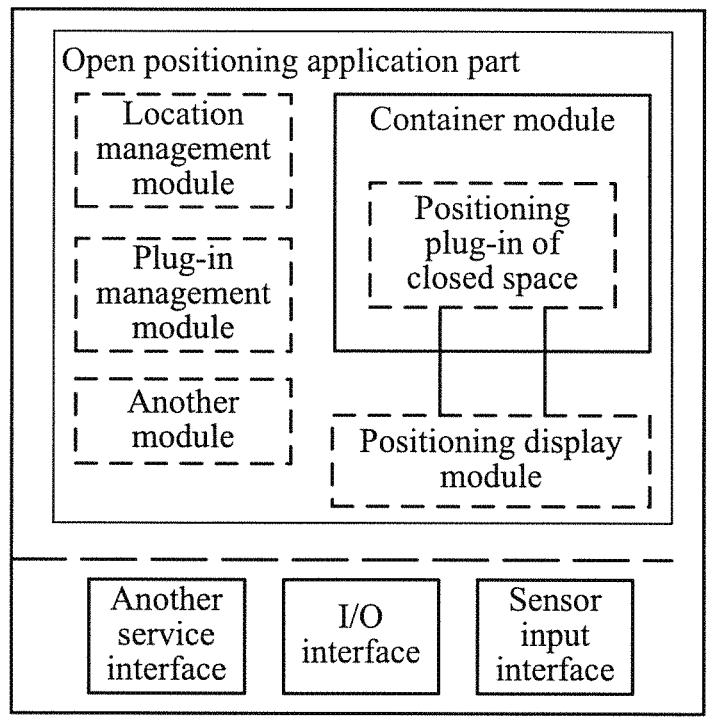
FIG. 4 is a schematic architectural diagram of a terminal according to an embodiment of the present invention.

In the first manner, as shown in FIG. 4, the open positioning application program run by the terminal includes a location management module, a plug-in management module, a container module (Container) configured to run a plug-in, a positioning display module, and another module. The container module includes a closed positioning program in a form of a plug-in, and the closed positioning program and an open positioning application part share the positioning display module. The location management module manages information about a mapping between a closed positioning program already downloaded by the terminal and a location in open space, and maintains the closed positioning program that is already downloaded. The plug-in management module maintains versions of a closed positioning program and map data that correspond to closed space of a location in open space. After a change in a location in open space triggers a closed positioning service of a piece of closed space, the location management module checks versions of a closed positioning program and map data that correspond to the closed space of the location in the open space in the terminal with a server providing the closed positioning service, to check whether the versions are latest versions, and sends a prompt if the versions are not the latest versions, so that the latest versions of the closed positioning program and the map data are downloaded from the server providing the closed positioning service. After downloading is completed, the plug-in management module maintains information about the latest versions of the plug-in and the map data. In a process of running the open positioning application part, the terminal selects, according to a location of the terminal in open space, a closed positioning program matching closed space corresponding to the location; after a closed positioning function is triggered, the container module loads and executes the selected closed positioning program, where the closed space positioning program is run as a plug-in, and a positioning result is output to the positioning display module of the open positioning application part for displaying. In addition, the open positioning application part is further provided with a uniform data input/output I/O interface, a sensor input interface, and another service interface, where the sensor input interface is configured to receive a signal collected by a sensor.

Figure 5:
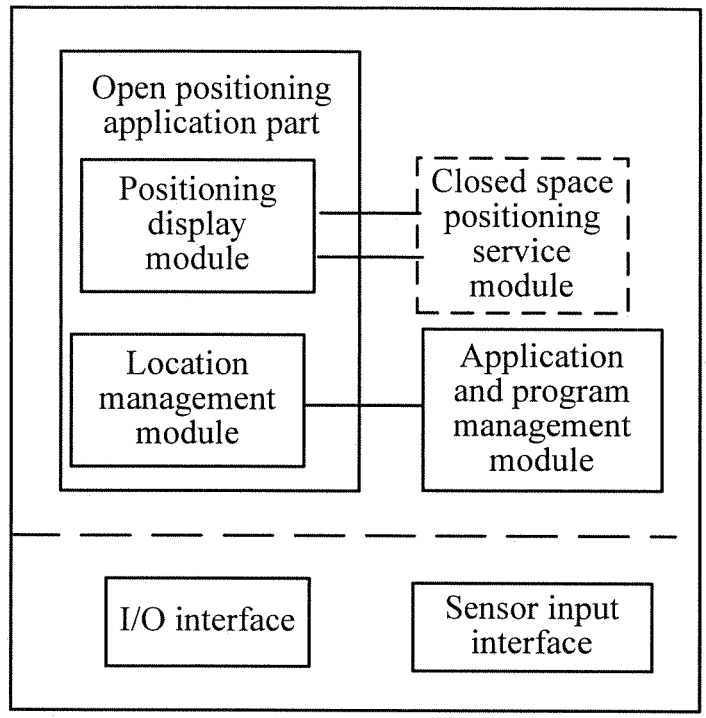
FIG. 5 is a schematic architectural diagram of another terminal according to an embodiment of the present invention.

In the second manner, as shown in FIG. 5, the terminal includes an open positioning application program, a closed space positioning service module, and an application and program management module that run on a hardware layer of the terminal. An open positioning application part includes a positioning display module and a location management module, where the location management module is configured to manage information about a mapping between a closed positioning program already downloaded by the terminal and a location in open space, and the application and program management module is configured to maintain the closed positioning program that is already downloaded. After a change in a location in open space triggers a positioning service of a piece of closed space, if the application and program service of a piece of closed space, if the application and program management module maintains versions of a closed positioning program and map data that correspond to the location, the location management module checks the versions of the program and the map data with a server of a closed positioning service domain, to check whether the versions are latest versions, and sends a prompt if the versions are not the latest versions, so that the latest versions of the closed positioning program and the map data are downloaded from the server providing a closed positioning service. After downloading is completed, the application and program management module maintains information about the latest versions of the closed positioning program and the map data that correspond to the closed space. In addition, the open positioning application part is further provided with a uniform data input/output I/O interface and a sensor input interface, where the sensor input interface is configured to receive a signal collected by a sensor.

Figure 6:
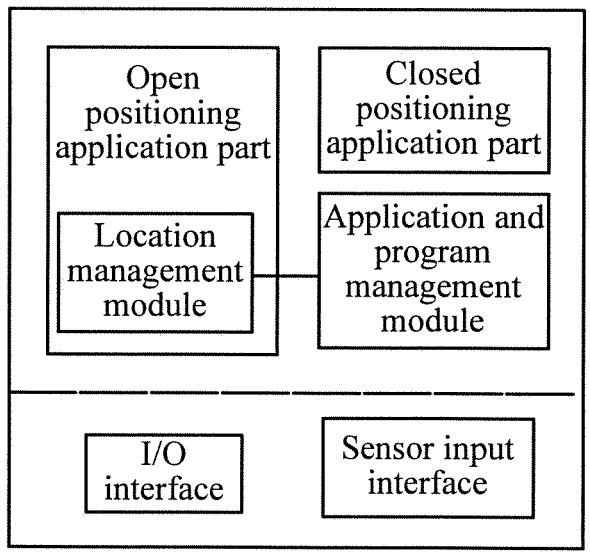
FIG. 6 is a schematic architectural diagram of still another terminal according to an embodiment of the present invention.

In the third manner, as shown in FIG. 6, the terminal includes an open positioning application part, a closed positioning application part, and an application and program management module, where the open positioning application part includes a location management module. The location management module manages information about a mapping between a closed positioning program already downloaded by the terminal and a location in open space. The application and program management module maintains the closed executed as independent applications in a system in which the two are located by the system. After a change in an open location triggers a positioning service of a piece of closed space, if the application and program manager maintains versions of a closed positioning program and map data that correspond to the location, the location manager checks the versions of the closed positioning program and the map data with a server of a closed map, to check whether the versions are latest versions, and sends a prompt if the versions are not the latest versions, so that the latest versions of the closed positioning program and the map data are downloaded from the server providing the closed positioning service. After downloading is completed, the application and program management module maintains information about the latest versions of the closed positioning program and the map data. In addition, the open positioning application part is further provided with a uniform data input/output I/O interface and a sensor input interface, where the sensor input interface is used to receive a signal collected by a sensor.

Figure 7:
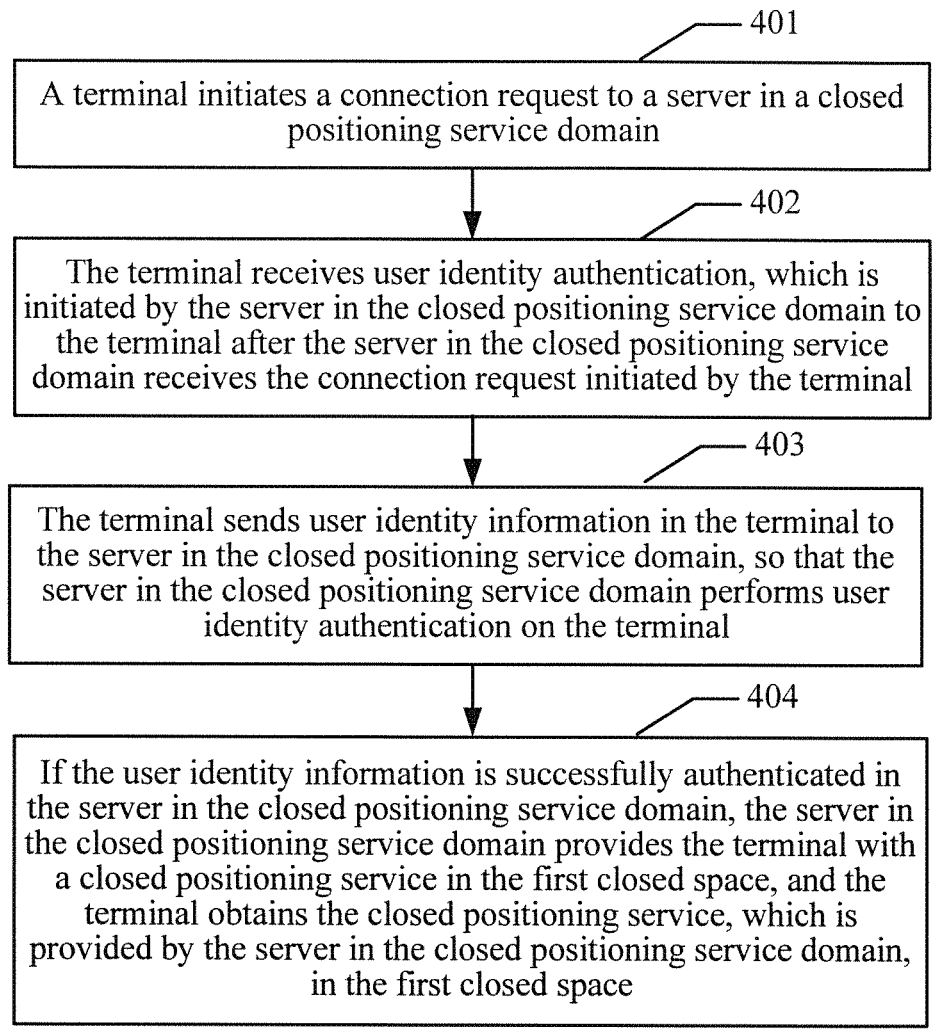
FIG. 7 is a schematic diagram of steps for authenticating identity information according to an embodiment of the present invention.

As shown in FIG. 7, in order to improve security of the positioning program application of the closed space, when using the closed positioning program, the server, which corresponds to the location of the terminal in the open space, of the closed positioning service domain may need to perform identity authentication on a user. Therefore, the using the closed positioning program and the map data may further include:

401: The terminal initiates a connection request to the server in the closed positioning service domain.

402: The terminal receives user identity authentication, which is initiated by the server in the closed positioning service domain to the terminal after the server in the closed positioning service domain receives the connection request initiated by the terminal.

403: The terminal sends user identity information in the terminal to the server in the closed positioning service domain, so that the server in the closed positioning service domain performs user identity authentication on the terminal.

404: If the user identity information is successfully authenticated in the server in the closed positioning service domain, the server in the closed positioning service domain provides the terminal with a closed positioning service in the first closed space, and the terminal obtains the closed positioning service, which is provided by the server in the closed positioning service domain, in the first closed space.

The server of the closed positioning service domain determines, by performing authentication on identity information, whether the closed positioning service is to be provided, and may provide the closed positioning service only for a user of the server belonging to the closed positioning service domain. For example, a server of a closed positioning service domain of a mall provides a closed positioning service of the mall only for a member user of the mall, thereby implementing a targeted service. In this embodiment, the server of the closed positioning service domain includes a positioning management service module and a membership management module, where the membership management module is configured to manage identity information of a member, and an identity identification submodule in the positioning management service module performs authentication on identity information sent by the terminal.

Embodiment 3

Figure 8:
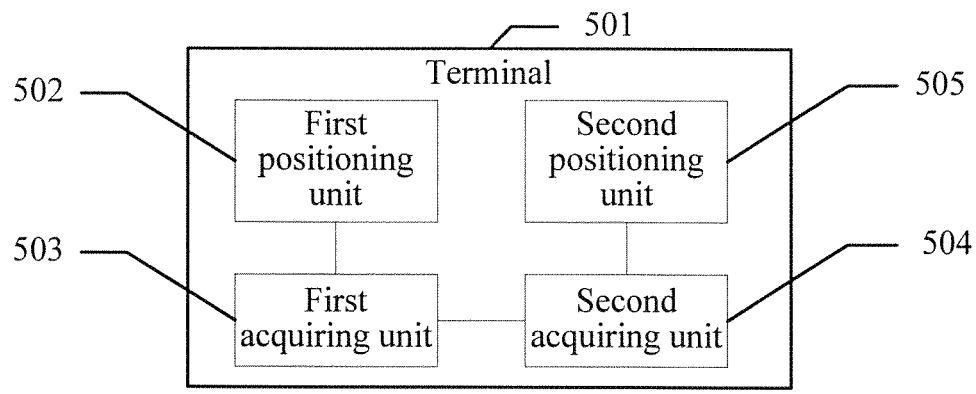
FIG. 8 is a schematic structural diagram of a terminal according to an embodiment of the present invention.

As shown in FIG. 8, Embodiment 3 of the present invention provides a terminal 501, including:

a first positioning unit 502, configured to determine a location of the terminal 501 in open space by using an open positioning program;

a first acquiring unit 503, configured to acquire, according to the location that is of the terminal 501 in the open space and that is determined by the first positioning unit 502, an address of a second server in a closed positioning service domain from mapping information stored in a first server in an open positioning service domain, where the mapping information includes a mapping relationship between the location of the terminal 501 in the open space and the address of the second server;

a second acquiring unit 504, configured to acquire map data of first closed space from the second server according to the address, which is acquired by the first acquiring unit 503, of the second server and the location of the terminal 501 in the open space, where the first closed space is closed space corresponding to the location of the terminal 501 in the open space; and a second positioning unit 505, configured to acquire location information of the terminal 501 in the first closed space by using a closed positioning program and the map data, which is acquired by the second acquiring unit 504, of the first closed space.

In this embodiment of the present invention, there is a correspondence between a location in open space and closed space; and the first acquiring unit 503 of the terminal 501 can acquire, according to a location of the terminal 501 in open space, an address of a second server in a closed positioning service domain from mapping information stored in a first server in an open positioning service domain, where there is a correspondence between the address of the second server and the location of the terminal 501 in the open space, and the second server is configured to provide map data of first closed space. Therefore, it can be determined that the location of the terminal 501 in the open space corresponds to the first closed space. After the second acquiring unit 504 acquires the map data of the first closed space from the second server, the second positioning unit 505 may perform closed positioning for the terminal 501 by using the closed positioning program and the map data of the first closed space, thereby implementing a function of automatic closed positioning of the terminal 501. Because in an entire positioning process, there is no need to artificially identify the closed space in which the terminal 501 is located and search for the corresponding closed positioning program, convenience is provided for a user, and accuracy of closed positioning can be improved.

Embodiment 4

Figure 9:
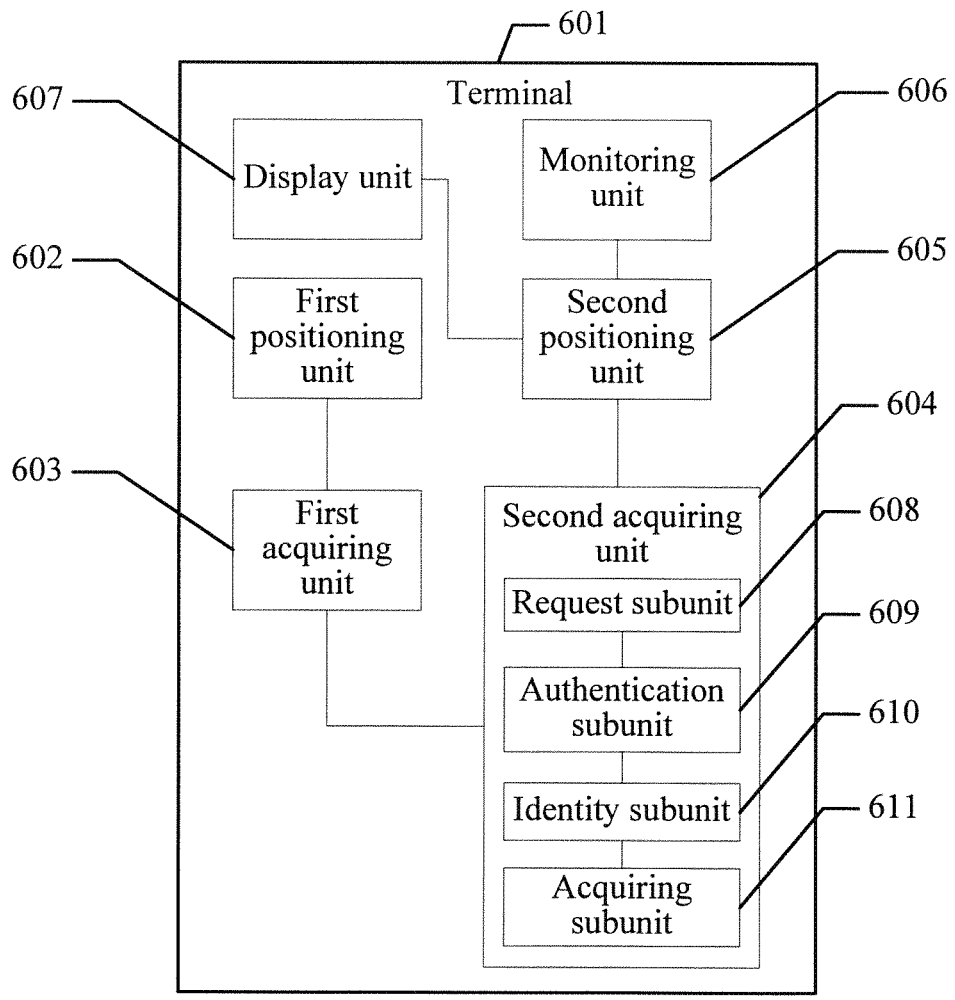
FIG. 9 is a schematic structural diagram of a terminal according to an embodiment of the present invention.

As shown in FIG. 9, Embodiment 4 of the present invention provides a terminal 601, including:

a first positioning unit 602, configured to determine a location of the terminal 601 in open space by using an open positioning program;

a first acquiring unit 603, configured to acquire, according to the location that is determined by the first positioning unit 602 and that is of the terminal 601 in the open space, an address of a second server in a closed positioning service domain from mapping information stored in a first server in an open positioning service domain, where the mapping information includes a mapping relationship between the location of the terminal 601 in the open space and the address of the second server;

a second acquiring unit 604, configured to acquire map data of first closed space from the second server according to the address, which is acquired by the first acquiring unit 603, of the second server and the location of the terminal 601 in the open space, where the first closed space is closed space corresponding to the location of the terminal 601 in the open space;

a second positioning unit 605, configured to: when a monitoring unit 606 detects that the terminal enters the first closed space, run the closed positioning program, so that the closed positioning program performs closed positioning for the terminal by using the map data of the first closed space, to obtain location information of the terminal in the first closed space; and the monitoring unit 606, configured to: before the second positioning unit 605 acquires the location information of the terminal in the first closed space by using the closed positioning program and the map data of the first closed space, monitor whether the terminal enters the first closed space.

Preferably, the second acquiring unit 604 is further configured to:

acquire the closed positioning program from the second server, and load the closed positioning program as a plug-in into the open positioning program; and the second positioning unit 605 is specifically configured to:

run the closed positioning program by using the open positioning program, so that the closed positioning program performs the closed positioning for the terminal 601 by using the map data of the first closed space, to obtain the location information of the terminal 601 in the first closed space.

Preferably, the terminal 601 further includes a display unit 607, where the display unit 607 is configured to display, by using the open positioning program, the location information that is of the terminal 601 in the first closed space and that is acquired by the second positioning unit 605.

Preferably, the second acquiring unit 604 includes:

a request subunit 608, configured to initiate a connection request to the second server according to the address of the second server;

an authentication subunit 609, configured to receive a user identity authentication request, which is initiated by the second server to the terminal 601 after the second server receives the connection request;

an identity subunit 610, configured to: after the authentication subunit 609 receives the user identity authentication request, send user identity information in the terminal 601 to the second server, so that the second server performs authentication on the user identity information; and an acquiring subunit 611, configured to: if the user identity information is successfully authenticated in the second server, acquire the map data of the first closed space from the second server.

Embodiment 5

Figure 10:
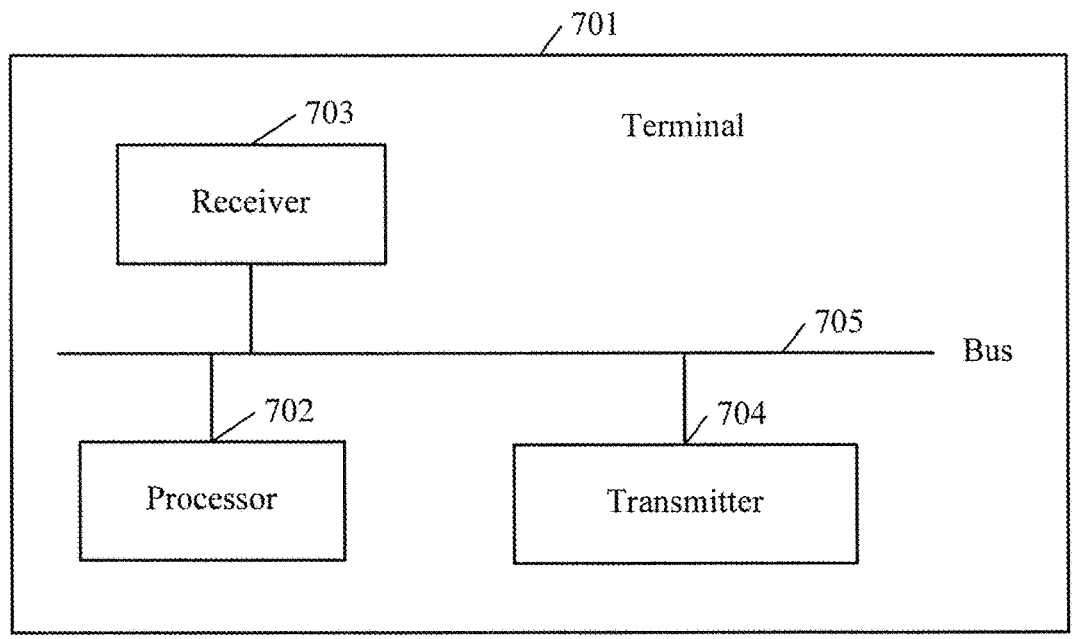
FIG. 10 is a schematic structural diagram of a terminal according to an embodiment of the present invention.

As shown in FIG. 10, a terminal 701 includes: a processor 702 and a transmitter 704 and a receiver 703 that are separately connected to the processor 702, where the processor 702, the receiver 703, and the transmitter 704 may be connected by using a bus 705 or in another connection manner, which is not limited herein. In the terminal 701, the processor 702 is configured to:

determine a location of the terminal 701 in open space by using an open positioning program;

after the location of the terminal 701 in the open space is determined, send first request information to a first server by using the transmitter 704, where the first request information includes location information of the terminal 701 in the open space, so that the first server sends an address of a second server in mapping information in the first server to the terminal 701 according to the first request information, where the first server is a server in an open positioning service domain, the second server is a server in a closed positioning service domain, and the mapping information includes a mapping relationship between the location of the terminal 701 in the open space and the address of the second server;

receive, by using the receiver 703, the address of the second server sent by the first server, and send, by using the transmitter 704, second request information to the second server according to the address of the second server received by the receiver 703, so that the second server sends map data of first closed space to the terminal 701 according to the second request information, where the first closed space is closed space corresponding to the location of the terminal 701 in the open space; and receive, by using the receiver 703, the map data of the first closed space sent by the second server, and acquire location information of the terminal 701 in the first closed space by using the closed positioning program and the map data of the first closed space.

Figure 11:
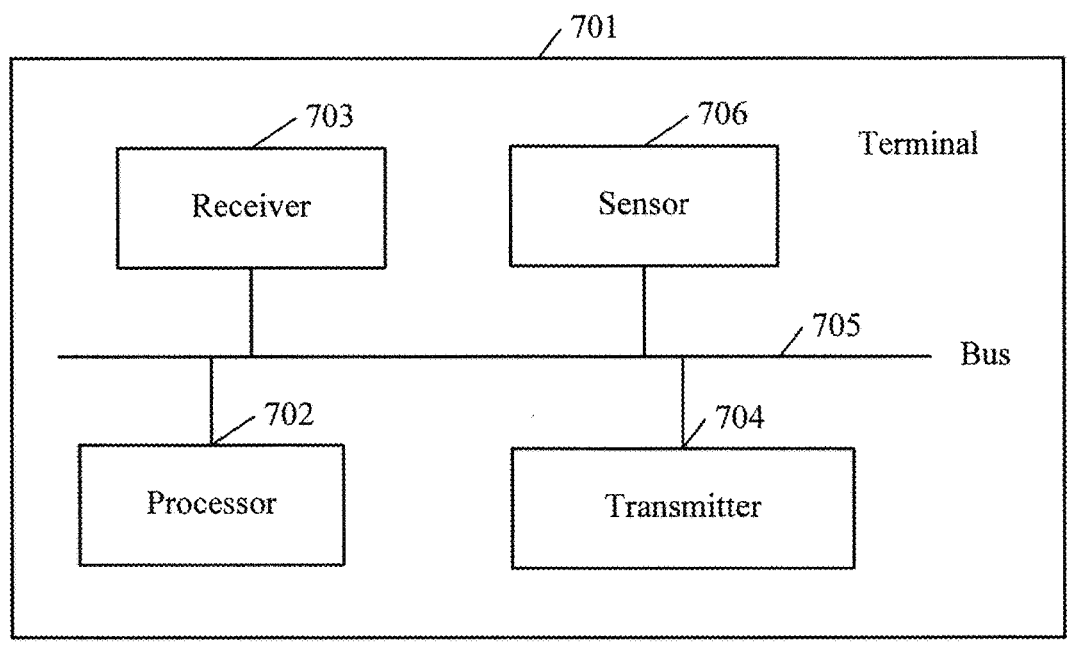
FIG. 11 is a schematic structural diagram of a terminal including a sensor according to an embodiment of the present invention.

As shown in FIG. 11, preferably, the terminal 701 may further include a sensor 706 connected to the processor 702, where the sensor 706 is configured to: before the processor 702 acquires the location information of the terminal 701 in the first closed space by using the closed positioning program and the map data of the first closed space, monitor whether the terminal 701 enters the first closed space; and in the aspect of acquiring the location information of the terminal 701 in the first closed space by using the closed positioning program and the map data of the first closed space, the processor 702 closed positioning program is specifically configured to: when the terminal 701 detects that the terminal 701 enters the first closed space, run the closed positioning program, so that the closed positioning program acquires the location information of the terminal 701 in the first closed space by using the map data of the first closed space.

Preferably, the processor 702 is further configured to receive, by using the receiver 703, the closed positioning program sent by the second server, and load the closed positioning program as a plug-in into the open positioning program; and in the aspect of acquiring the location information of the terminal 701 in the first closed space by using the closed positioning program and the map data of the first closed space, the processor 702 closed positioning program is specifically configured to run the closed positioning program by using the open positioning program, so that the closed positioning program performs closed positioning for the terminal 701 by using the map data of the first closed space, to obtain the location information of the terminal 701 in the first closed space.

Preferably, the processor 702 is further configured to: after the location information of the terminal 701 in the first closed space is acquired by using the closed positioning program and the map data of the first closed space, display the acquired location information of the terminal 701 in the first closed space by using the open positioning program.

Preferably, in the aspect of sending, by using the transmitter 704, the second request information to the second server according to the address of the second server received by the receiver 703, the processor 702 is specifically configured to initiate, by using the transmitter 704, a connection request to the second server according to the address of the second server received by the receiver 703;

the transmitter 704 is specifically configured to: after the transmitter 704 initiates the connection request to the second server, receive a user identity authentication request initiated by the second server to the terminal 701; and the processor 702 is further configured to: after the user identity authentication request initiated by the second server is received, send, by using the transmitter 704, user identity information in the terminal 701 to the second server, so that the second server performs authentication on the user identity information; and if the user identity information is successfully authenticated in the server in the closed positioning service domain, receive, by using the receiver 703, the closed positioning program and the map data of the first closed space that are sent by the second server.

Embodiment 6

Figure 12:
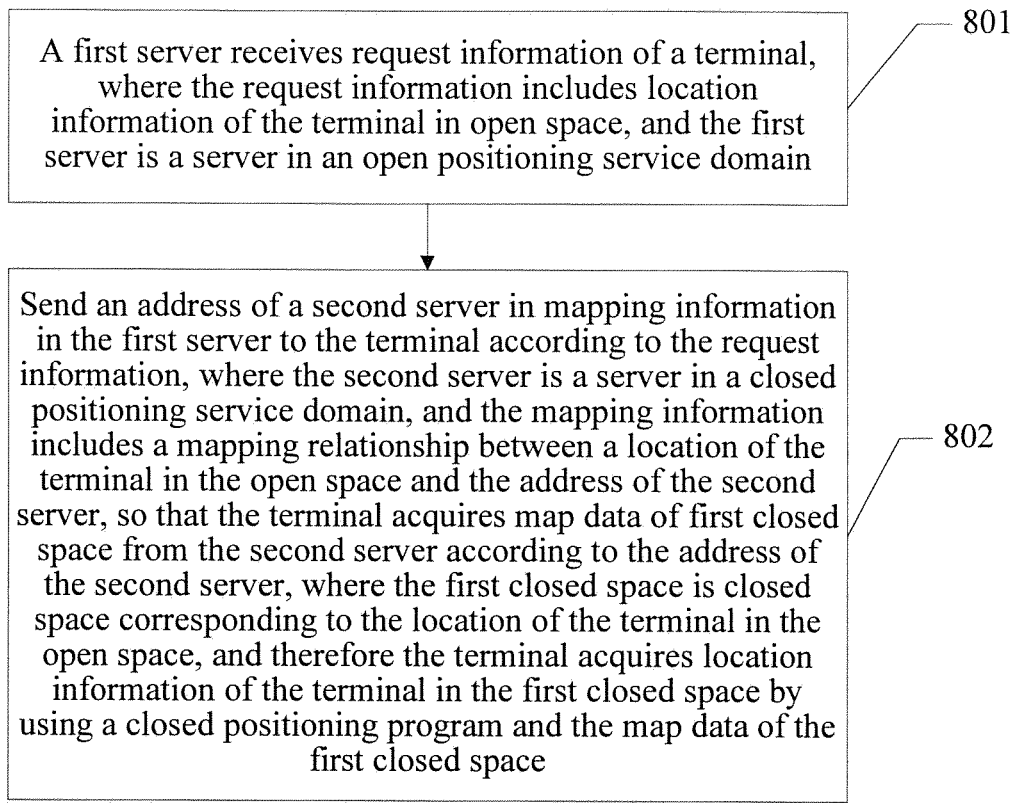
FIG. 12 is a schematic flowchart of a server address providing method according to an embodiment of the present invention.

As shown in FIG. 12, Embodiment 6 of the present invention provides a server address providing method, including:

801: A first server receives request information of a terminal, where the request information includes location information of the terminal in open space, and the first server is a server in an open positioning service domain.

802: Send an address of a second server in mapping information in the first server to the terminal according to the request information, where the second server is a server in a closed positioning service domain, and the mapping information includes a mapping relationship between a location of the terminal in the open space and the address of the second server, so that the terminal acquires map data of first closed space from the second server according to the address of the second server, where the first closed space is closed space corresponding to the location of the terminal in the open space, and therefore the terminal acquires location information of the terminal in the first closed space by using a closed positioning program and the map data of the first closed space.

Embodiment 7

Figure 13:
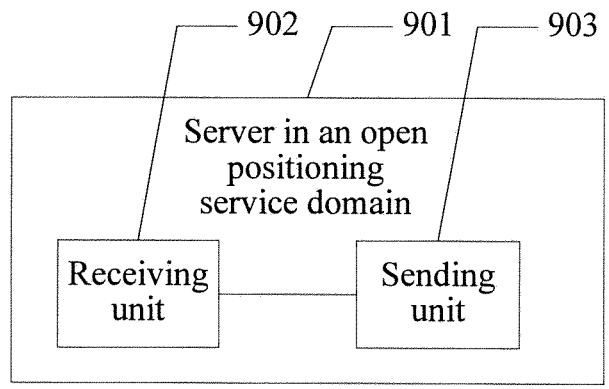
FIG. 13 is a schematic structural diagram of a server in an open positioning service domain according to an embodiment of the present invention.

As shown in FIG. 13, Embodiment 7 of the present invention provides a server 901 in an open positioning service domain, including:

a receiving unit 902, configured to receive request information of a terminal, where the request information includes location information of the terminal in open space; and a sending unit 903, configured to send an address of a second server in mapping information in the server 901 in the open positioning service domain to the terminal according to the request information received by the receiving unit 902, where the second server is a server in a closed positioning service domain, and the mapping information includes a mapping relationship between a location of the terminal in the open space and the address of the second server, so that the terminal acquires map data of first closed space from the second server according to the address of the second server, where the first closed space is closed space corresponding to the location of the terminal in the open space, and therefore the terminal acquires location information of the terminal in the first closed space by using a closed positioning program and the map data of the first closed space.

Embodiment 8

As shown in FIG. 14, Embodiment 8 of the present invention provides a server 1001 in an open positioning service domain, including: a processor 1002 and a transmitter 1004 and a receiver 1003 that are separately connected to the processor 1002, where the processor 1002, the receiver 1003, and the transmitter 1004 may be connected by using a bus 1005 or in another connection manner, which is not limited herein. In the server 1001 in the open positioning service domain, the processor 1002 is configured to:

receive request information of a terminal by using the receiver 1003, where the request information includes location information of the terminal in open space; and send, by using the transmitter 1004, an address of a second server in mapping information in the server 1001 in the open positioning service domain to the terminal according to the request information received by the receiver 1003, where the second server is a server in a closed positioning service domain, and the mapping information includes a mapping relationship between a location of the terminal in the open space and the address of the second server, so that the terminal acquires map data of first closed space from the second server according to the address of the second server, where the first closed space is closed space corresponding to the location of the terminal in the open space, and therefore the terminal acquires location information of the terminal in the first closed space by using a closed positioning program and the map data of the first closed space.

Embodiment 9

As shown in FIG. 15, Embodiment 9 of the present invention provides a method for providing a closed positioning service, including:

1101: A server in an open positioning service domain receives request information sent by a terminal, where the request information is used to request the server in the open positioning service domain to send map data of first closed space to the terminal, and the first closed space is closed space corresponding to a location of the terminal in the open space.

1102: Send the map data of the first closed space to the terminal according to the request information.

Preferably, after the receiving, by a server in an open positioning service domain, request information sent by the terminal, the method further includes:

initiating, by the server in the open positioning service domain, a user identity authentication request to the terminal, so that the terminal sends user identity information in the terminal to a server in the closed positioning service domain;

receiving the user identity information sent by the terminal, and performing authentication on the user identity information; and if the user identity information is successfully authenticated in the server in the closed positioning service domain, sending the map data of the first closed space to the terminal.

Embodiment 10

Figure 16:
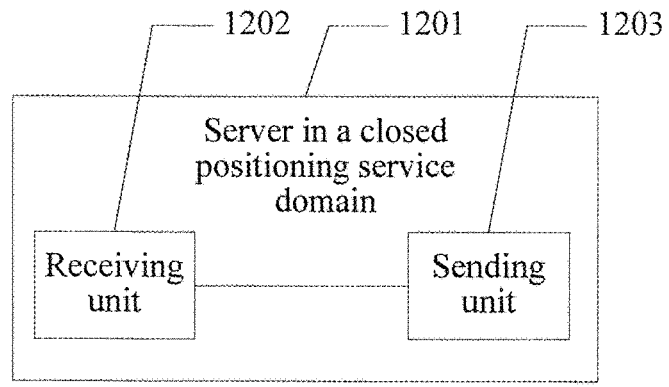
FIG. 16 is a schematic structural diagram of a server in a closed positioning service domain according to an embodiment of the present invention.

As shown in FIG. 16, Embodiment 10 of the present invention provides a server 1201 in a closed positioning service domain, including:

a receiving unit 1202, configured to receive request information sent by a terminal, where the request information is used to request a server in the open positioning service domain to send map data of first closed space to the terminal, and the first closed space is closed space corresponding to a location of the terminal in the open space; and a sending unit 1203, configured to send the map data of the first closed space to the terminal according to the request information received by the receiving unit 1202.

Figure 17:
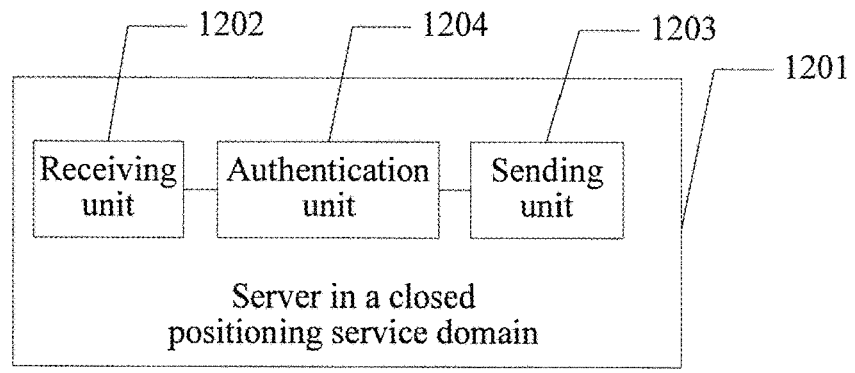
FIG. 17 is a schematic structural diagram of a server, including an authentication unit, in a closed positioning service domain according to an embodiment of the present invention.

As shown in FIG. 17, the server in the closed positioning service domain may further include:

an authentication unit 1204, configured to: after the server in the open positioning service domain receives the request information sent by the terminal, initiate a user identity authentication request to the terminal, so that the terminal sends user identity information in the terminal to the server in the closed positioning service domain; and configured to receive the user identity information sent by the terminal, and perform authentication on the user identity information; and if the user identity information is successfully authenticated in the server in the closed positioning service domain, send the map data of the first closed space to the terminal.

Embodiment 11

Figure 18:
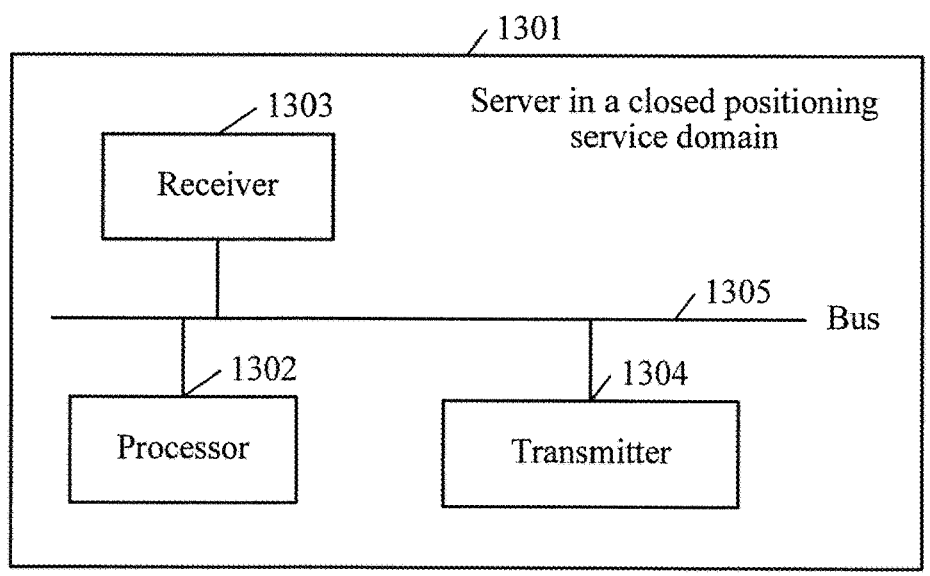
FIG. 18 is a schematic structural diagram of a server in a closed positioning service domain according to an embodiment of the present invention.

As shown in FIG. 18, Embodiment 11 of the present invention provides a server 1301 in a closed positioning service domain, including: a processor 1302 and a transmitter 1304 and a receiver 1303 that are separately connected to the processor 1302, where the processor 1302, the receiver 1303, and the transmitter 1304 may be connected by using a bus 1305 or in another connection manner, which is not limited herein. In the server 1301 in the closed positioning service domain, the processor 1302 is configured to:

receive, by using the receiver 1303, request information sent by a terminal, where the request information is used to request a server in the open positioning service domain to send map data of first closed space to the terminal, and the first closed space is closed space corresponding to a location of the terminal in the open space; and send, by using the transmitter 1304, the map data of the first closed space to the terminal according to the request information received by the receiver 1303.

Preferably, the processor 1302 is further configured to:

after the receiver 1303 receives the request information sent by the terminal, initiate a user identity authentication request to the terminal by using the transmitter 1304, so that the terminal sends user identity information in the terminal to the server 1301 in the closed positioning service domain; and receive, by using the receiver 1303, the user identity information sent by the terminal, and perform authentication on the user identity information; and if the user identity information is successfully authenticated in the server 1301 in the closed positioning service domain, send the map data of the first closed space to the terminal by using the transmitter 1304.

Embodiment 12

Figure 19:
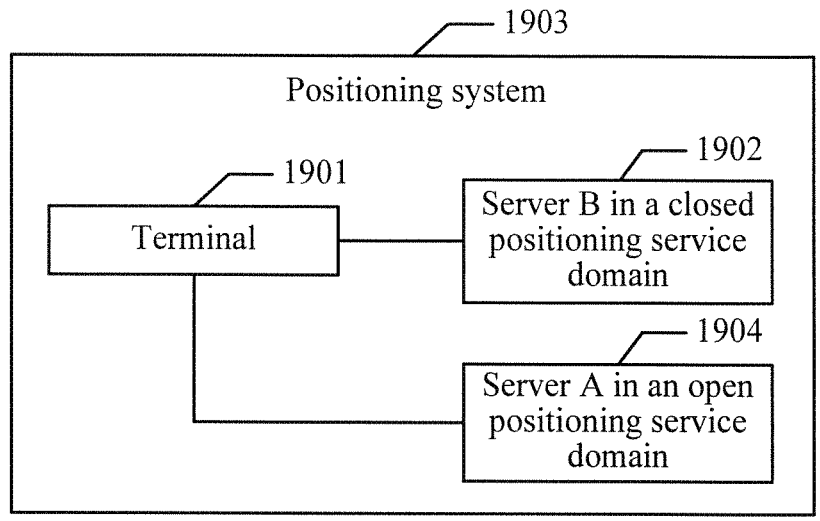
FIG. 19 is a structural block diagram of a positioning system according to an embodiment of the present invention.

As shown in FIG. 19, Embodiment 12 of the present invention provides a positioning system 1903, including:

a terminal 1901 and a server A1904 in an open positioning service domain, where the terminal 1901 acquires a location of the terminal 1901 in open space by using an open positioning program, determines, according to the location of the terminal 1901 in the open space, a server B1902 that corresponds to the location of the terminal 1901 in the open space and that is of a closed positioning service domain by using a correspondence that is stored in the server A1904 and that is between the location in the open space and an address of the server in the closed positioning service domain, and acquires map data of first closed space from the server B1902 according to the address of the server B1902 and the location of the terminal 1901 in the open space, where the first closed space is closed space corresponding to the location of the terminal 1901 in the open space; and finally, the terminal 1901 performs closed positioning for the terminal 1901 by using a closed positioning program corresponding to the first closed space and the map data; and the server B1902 in the closed positioning service domain, configured to: when the terminal 1901 uses the closed positioning program and the map data that correspond to the first closed space, provide a closed positioning service for the terminal 1901.

The server A1904 in the open positioning service domain is configured to: after the location of the terminal 1901 in the open space sent by the terminal 1901 is received, send information about a mapping between the location of the terminal 1901 in the open space and the address of the server in the closed positioning service domain to the terminal 1901.

Preferably, the terminal 1901 is further configured to: when the closed positioning program corresponding to the first closed space is not installed in the terminal 1901, acquire the closed positioning program corresponding to the first closed space from the server B1902 of the closed positioning service domain; and when the map data of the first closed space is not installed in the terminal 1901, acquire the map data of the first closed space from the server B1902 of the closed positioning service domain; and the server B1902 of the closed positioning service domain is further configured to detect whether the closed positioning program corresponding to the first closed space is installed in the terminal 1901, and send the closed positioning program corresponding to the first closed space to the terminal 1901 when detecting that the closed positioning program corresponding to the first closed space is not installed in the terminal 1901; and is configured to detect whether the map data of the first closed space is installed in the terminal 1901, and send the map data of the first closed space to the terminal 1901 when detecting that the map data of the first closed space is not installed in the terminal 1901.

Figure 20:
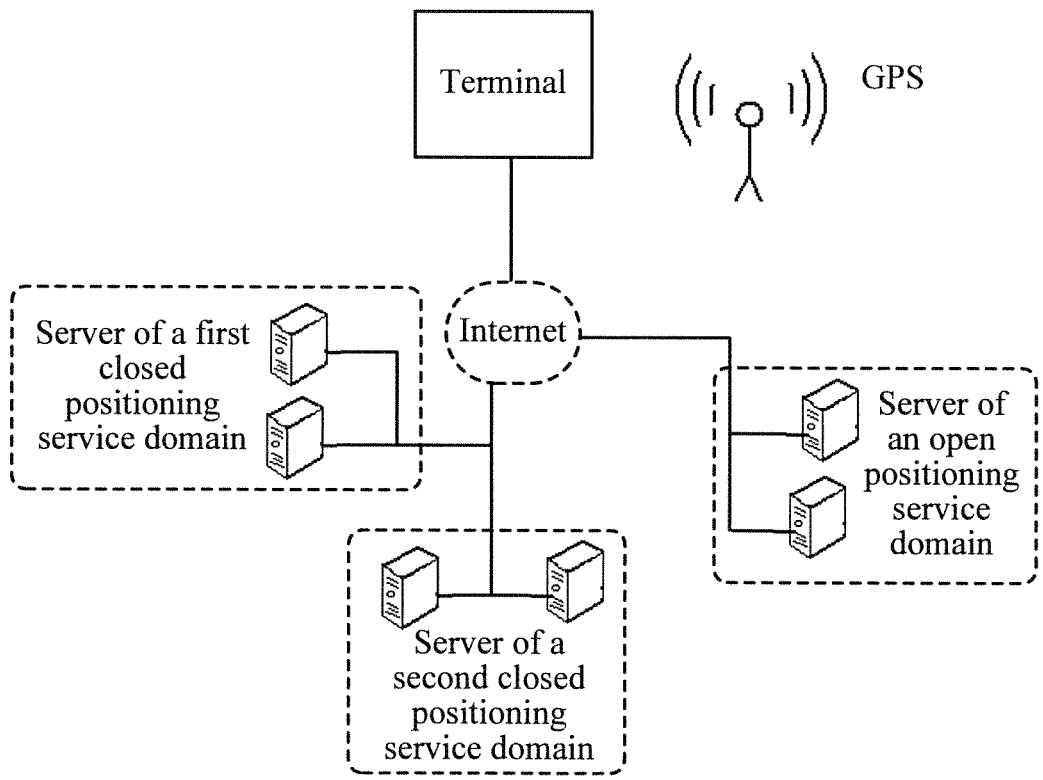
FIG. 20 is a schematic structural diagram of a positioning system according to an embodiment of the present invention.

For example, as shown in FIG. 20, a positioning system includes: a terminal, a GPS, a server of a first closed positioning service domain, a server of a second closed positioning service domain, and a server of an open positioning service domain. The terminal acquires a location of the terminal in open space by using the GPS, and searches, according to the location of the terminal in the open space, a table of mapping relationships between locations of open space and addresses of severs of closed positioning service domains in the server of the open positioning service domain by using the Internet. In the mapping relationship table, the location of the terminal in the open space corresponds to the server of the first closed positioning service domain, and another location in the open space corresponding to the server of the second closed positioning service domain. Therefore, the terminal acquires information about a mapping between the location of the terminal in the open space and an address of the server of the first closed positioning service domain from the server of the open positioning service domain, then accesses the server of the first closed positioning service domain according to the address of the server of the first closed positioning service domain in the mapping information, and acquires a closed positioning service from the server of the first closed positioning service domain after identity authentication succeeds, where the closed positioning service includes providing a closed positioning program and a map of closed space entered by the terminal. It can be seen that in the positioning system, closed positioning services of different pieces of closed space can be provided by servers of different closed positioning service domains, thereby improving a capability of a terminal in accessing a server of a closed positioning service domain and improving user experience. In this embodiment, an apparatus having an open space positioning capability may be a GPS or an assisted GPS (Assisted GPS, A-GPS) technology, or may be a cell station (Cell Station) and/or WiFi.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The storage medium may be a magnetic disk, an optical disc, a read-only memory (Read-Only Memory, ROM), a random access memory (Random Access Memory, RAM), or the like.

The foregoing introduces in detail the positioning method, the terminal, and the server provided by the embodiments of the present invention. For a person of ordinary skill in the art, alterations may be made to the specific implementation manners or application scope according to the idea of the embodiments of the present invention. Therefore, the content of this specification shall not be understood as a limitation on the present invention.

What is claimed is:

1. A positioning method, comprising:
   determining, by a terminal, a geographic location of the terminal in open space by using an open positioning program;
   acquiring, by the terminal according to the location of the terminal in the open space, an address of a second server from a mapping relationship table stored in a first server, wherein the first server is a server in an open positioning service domain, the second server is a server in a closed positioning service domain, and the mapping relationship table comprises a mapping relationship between the location of the terminal in the open space and the address of the second server;

acquiring, by the terminal, map data of first closed space from the second server according to the address of the second server and the location of the terminal in the open space, wherein the first closed space is closed space corresponding to the location of the terminal in the open space; and acquiring, by the terminal, location information of the terminal in the first closed space by using a closed positioning program that interacts with the second server to provide a closed positioning service to the terminal including performing positioning in closed space and providing the map data of the first closed space.

2. The positioning method according to claim 1, wherein:

before acquiring, by the terminal, location information of the terminal in the first closed space by using the closed positioning program used to perform positioning in closed space and the map data of the first closed space, the method further comprises:

monitoring, by the terminal, whether the terminal enters the first closed space; and acquiring, by the terminal, location information of the terminal in the first closed space by using a closed positioning program used to perform positioning in closed space and the map data of the first closed space comprises:

when it is detected that the terminal enters the first closed space, performing, by the terminal running the closed positioning program, closed positioning for the terminal by using the map data of the first closed space, to obtain the location information of the terminal in the first closed space.

3. The positioning method according to claim 1, wherein:

before acquiring, by the terminal, location information of the terminal in the first closed space by using the closed positioning program used to perform positioning in closed space and the map data of the first closed space, the method further comprises:

acquiring, by the terminal, the closed positioning program from the second server, and loading, by the terminal, the closed positioning program as a plug-in into the open positioning program; and acquiring, by the terminal, location information of the terminal in the first closed space by using the closed positioning program used to perform positioning in closed space and the map data of the first closed space comprises:

running, by the terminal, the closed positioning program by using the open positioning program, so that the closed positioning program performs the closed positioning for the terminal by using the map data of the first closed space, to obtain the location information of the terminal in the first closed space.

4. The positioning method according to claim 3, wherein after acquiring, by the terminal, location information of the terminal in the first closed space by using the closed positioning program used to perform positioning in closed space and the map data of the first closed space, the method further comprises:

displaying, by the terminal, the acquired location information of the terminal in the first closed space by using the open positioning program.

5. The positioning method according to claim 1, wherein acquiring, by the terminal, map data of first closed space from the second server according to the address of the second server and the location of the terminal in the open space comprises:

initiating, by the terminal, a connection request to the second server according to the address of the second server;

receiving, by the terminal, a user identity authentication request from the second server;

sending, by the terminal, user identity information in the terminal to the second server for enabling the second server to perform authentication on the user identity information; and if the user identity information is successfully authenticated in the second server, acquiring the map data of the first closed space from the second server.

6. A terminal, comprising:

a memory; and a processor connected to communicate with the memory, wherein the processor is configured to:

determine a geographic location of the terminal in open space by using an open positioning program;

acquire, according to the location of the terminal in the open space, an address of a second server in a closed positioning service domain from a mapping relationship table stored in a first server in an open positioning service domain, wherein the mapping relationship table comprises a mapping relationship between the location of the terminal in the open space and the address of the second server;

acquire map data of first closed space from the second server according to the address of the second server and the location of the terminal in the open space, wherein the first closed space is closed space corresponding to the location of the terminal in the open space; and acquire location information of the terminal in the first closed space by using a closed positioning program that interacts with the second server to provide a closed positioning service to the terminal including the map data of the first closed space.

7. The terminal according to claim 6, wherein:

the processor is further configured to:

before acquiring the location information of the terminal in the first closed space by using the closed positioning program and the map data of the first closed space, monitor whether the terminal enters the first closed space; and when the processor detects that the terminal enters the first closed space, run the closed positioning program, so that the closed positioning program performs closed positioning for the terminal by using the map data of the first closed space, to obtain the location information of the terminal in the first closed space.

8. The terminal according to claim 6, wherein:

the processor is further configured to:

acquire the closed positioning program from the second server, and load the closed positioning program as a plug-in into the open positioning program; and run the closed positioning program by using the open positioning program, so that the closed positioning program performs the closed positioning for the terminal by using the map data of the first closed space, to obtain the location information of the terminal in the first closed space.

9. The terminal according to claim 8, further comprising:
a display, configured to display the location information of the terminal in the first closed space by using the open positioning program.

10. The terminal according to claim 6, wherein processor is further configured to:
initiate a connection request to the second server according to the address of the second server;
receive a user identity authentication request, which is initiated by the second server to the terminal after the second server receives the connection request;
after the user identity authentication request is received, send user identity information in the terminal to the second server, for enabling the second server to perform authentication on the user identity information; and
if the user identity information is successfully authenticated in the second server, acquire the map data of the first closed space from the second server.

11. A terminal, comprising:
a transmitter;
a receiver; and
a processor separately connected to transmitter and the receiver, the processor configured to:
determine a geographic location of the terminal in open space by using an open positioning program,
after the location of the terminal in the open space is determined, send first request information to a first server by using the transmitter, wherein the first request information comprises location information of the terminal in the open space, for enabling the first server to send an address of a second server according to a mapping relationship table in the first server to the terminal according to the first request information, wherein the first server is a server in an open positioning service domain, the second server is a server in a closed positioning service domain, and the mapping relationship table comprises a mapping relationship between the location of the terminal in the open space and the address of the second server,
receive, by using the receiver, the address of the second server sent by the first server, and send, by using the transmitter, second request information to the second server according to the address of the second server received by the receiver, for instructing the second server to send map data of first closed space to the terminal according to the second request information, wherein the first closed space is closed space corresponding to the location of the terminal in the open space, and
receive, by using the receiver, the map data of the first closed space sent by the second server, and acquire location information of the terminal in the first closed space by using a closed positioning program and the map data of the first closed space, wherein the closed positioning program interacts with the second server to provide a closed positioning service to the terminal including the map data of the first closed space.

12. The terminal according to claim 11, further comprising:
a sensor connected to the processor; and
the processor is further configured to:
before the processor acquires the location information of the terminal in the first closed space by using the closed positioning program and the map data of the first closed space, monitor whether the terminal enters the first closed space; and
when the terminal detects that the terminal enters the first closed space, run the closed positioning program, so that the closed positioning program acquires the location information of the terminal in the first closed space by using the map data of the first closed space.

13. The terminal according to claim 11, wherein the processor is further configured to:
receive, by using the receiver, the closed positioning program sent by the second server, and load the closed positioning program as a plug-in into the open positioning program; and
run the closed positioning program by using the open positioning program, so that the closed positioning program performs closed positioning for the terminal by using the map data of the first closed space, to obtain the location information of the terminal in the first closed space.

14. The terminal according to claim 13, wherein the processor is further configured to:
after the location information of the terminal in the first closed space is acquired by using the closed positioning program and the map data of the first closed space, display the acquired location information of the terminal in the first closed space by using the open positioning program.

15. The terminal according to claim 11, wherein:
the processor is further configured to initiate, by using the transmitter, a connection request to the second server according to the address of the second server received by the receiver;
the transmitter is configured to: after the transmitter initiates the connection request to the second server, receive a user identity authentication request initiated by the second server to the terminal; and
the processor is further configured to: after the user identity authentication request initiated by the second server is received, send, by using the transmitter, user identity information in the terminal to the second server, for enabling the second server to perform authentication on the user identity information; and if the user identity information is successfully authenticated in the server in the closed positioning service domain, receive, by using the receiver, the map data of the first closed space sent by the second server.

16. A server address providing method, comprising:
receiving, by a first server, request information of a terminal, wherein the request information comprises geographic location information of the terminal in open space, and the first server is a server in an open positioning service domain; and
sending an address of a second server according to a mapping relationship table in the first server to the terminal according to the request information, wherein the second server is a server in a closed positioning service domain, and the mapping relationship table comprises a mapping relationship between a location of the terminal in the open space and the address of the second server, for enabling the terminal to acquire map data of first closed space from the second server according to the address of the second server, wherein the first closed space is closed space corresponding to the location of the terminal in the open space, and for enabling the terminal to acquire location information of the terminal in the first closed space by using a closed positioning program and the map data of the first closed space that interacts with the second server to provide a closed positioning service to the terminal including the map data of the first closed space.

17. A server in an open positioning service domain, the server comprising:
a memory; and
a processor connected to communicate with the memory, wherein the processor is configured to:
receive request information of a terminal, wherein the request information comprises geographic location information of the terminal in open space; and
send an address of a second server according to a mapping relationship table in the server in the open positioning service domain to the terminal according to the request information, wherein the second server is a server in a closed positioning service domain, and the mapping relationship table comprises a mapping relationship between a location of the terminal in the open space and the address of the second server, for enabling the terminal to acquire map data of first closed space from the second server according to the address of the second server, wherein the first closed space is closed space corresponding to the location of the terminal in the open space, and for enabling the terminal to acquire location information of the terminal in the first closed space by using a closed positioning program and the map data of the first closed space, wherein the closed positioning program is configured to interact with the second server to provide a closed positioning service to the terminal including the map data of the first closed space.

18. A server in an open positioning service domain, the server comprising:
a transmitter;
a receiver; and
a processor separately connected to the transmitter and the receiver and configured to:
receive request information of a terminal by using the receiver, wherein the request information comprises geographic location information of the terminal in open space, and
send, by using the transmitter, an address of a second server according to a mapping relationship table in the server in the open positioning service domain to the terminal according to the request information received by the receiver, wherein the second server is a server in a closed positioning service domain, and the mapping relationship table comprises a mapping relationship between a location of the terminal in the open space and the address of the second server, for enabling the terminal to acquire map data of first closed space from the second server according to the address of the second server, wherein the first closed space is closed space corresponding to the location of the terminal in the open space, and for enabling the terminal to acquire location information of the terminal in the first closed space by using a closed positioning program and the map data of the first closed space, wherein the closed positioning program is configured to interact with the second server to provide a closed positioning service to the terminal including the map data of the first closed space.

19. A method for providing a closed positioning service, the comprising: receiving, by a server in an open positioning service domain, request information sent by a terminal, wherein the request information is used to request the server in the open positioning service domain to send map data of a first closed space to the terminal, and the first closed space is closed space corresponding to a geographic location of the terminal in open space, wherein a mapping relationship table in the server in the open positioning service domain identifies a mapping relationship between the geographic location of the terminal in open space and an address of a server of the closed positioning service domain; and sending a closed positioning program corresponding to the first closed space to the terminal according to the request information for interacting with the server of a closed positioning service domain to provide a closed positioning service to the terminal including the map data of the first closed space.

20. The method for providing the closed positioning service according to claim 19, wherein after receiving, by a server in an open positioning service domain, request information sent by the terminal, the method further comprises:
initiating, by the server in the open positioning service domain, a user identity authentication request to the terminal, so that the terminal sends user identity information in the terminal to a server in a closed positioning service domain;
receiving the user identity information sent by the terminal, and performing authentication on the user identity information; and
if the user identity information is successfully authenticated in the server in the closed positioning service domain, sending the closed positioning program to the terminal.

21. A server in a closed positioning service domain, the server comprising:
a memory; and
a processor connected to communicate with the memory, wherein the processor is configured to:
receive request information sent by a terminal, wherein the request information is used to request a server in the open positioning service domain to send map data of a first closed space to the terminal, and the first closed space is closed space corresponding to a location of the terminal in open space, wherein a mapping relationship table in the server in the open positioning service domain identifies a mapping relationship between the location of the terminal in open space and an address of the server in the closed positioning service domain; and
send a closed positioning program corresponding to the first closed space to the terminal according to the request information for interacting with a server of a closed positioning service domain to provide a closed positioning service to the terminal including the map data of the first closed space.

22. The server in the closed positioning service domain according to claim 21, wherein the processor is further configured to:
after the server in the open positioning service domain receives the request information sent by the terminal, initiate a user identity authentication request to the terminal, so that the terminal sends user identity information in the terminal to the server in the closed positioning service domain;

receive the user identity information sent by the terminal, and perform authentication on the user identity information; and if the user identity information is successfully authenticated in the server in the closed positioning service domain, send the closed positioning program to the terminal.

23. A server in a closed positioning service domain, the server comprising:

a transmitter;

a receiver; and a processor separately connected to the transmitter and the receiver and configured to:

receive, by using the receiver, request information sent by a terminal, wherein the request information is used to request a server in the open positioning service domain to send map data of first closed space to the terminal, and the first closed space is closed space corresponding to a location of the terminal in the open space, wherein a mapping relationship table in the server in the open positioning service domain identifies a mapping relationship between the location of the terminal in open space and an address of the server in the closed positioning service domain, and send, by using the transmitter, a closed positioning program corresponding to the first closed space to the terminal according to the request information received by the receiver for interacting with a server of a closed positioning service domain to provide a closed positioning service to the terminal including the map data of the first closed space.

24. The server in the closed positioning service domain according to claim 23, wherein the processor is further configured to:

after the receiver receives the request information sent by the terminal, initiate a user identity authentication request to the terminal by using the transmitter, so that the terminal sends user identity information in the terminal to the server in the closed positioning service domain; and receive, by using the receiver, the user identity information sent by the terminal, and perform authentication on the user identity information; and if the user identity information is successfully authenticated in the server in the closed positioning service domain, send the closed positioning program to the terminal by using the transmitter.

* * * * *